(12) United States Patent
Shin et al.

(10) Patent No.: US 10,021,096 B2
(45) Date of Patent: Jul. 10, 2018

(54) BIOMETRIC INFORMATION MANAGEMENT METHOD AND BIOMETRIC INFORMATION MANAGEMENT APPARATUS

(71) Applicant: SUPREMA INC., Gyeonggi-do (KR)

(72) Inventors: Hochul Shin, Gyeonggi-do (KR);
Kideok Lee, Gyeonggi-do (KR);
Hyeonchang Lee, Gyeonggi-do (KR);
Bong Seop Song, Gyeonggi-do (KR);
Jae Won Lee, Gyeonggi-do (KR)

(73) Assignee: SUPREMA INC., Seongnam-si, Gyeonggi-Do (KR)

(*) Notice: Subject to any disclaimer, the term of this patent is extended or adjusted under 35 U.S.C. 154(b) by 186 days.

(21) Appl. No.: 15/204,754

(22) Filed: Jul. 7, 2016

(65) Prior Publication Data

US 2017/0041314 A1   Feb. 9, 2017

(30) Foreign Application Priority Data

Aug. 7, 2015 (KR) .................. 10-2015-0111640

(51) Int. Cl.
| | |
|---|---|
| *H04L 29/06* | (2006.01) |
| *G06F 21/32* | (2013.01) |
| *G06K 9/00* | (2006.01) |
| *H04L 9/08* | (2006.01) |
| *H04L 9/32* | (2006.01) |

(52) U.S. Cl.
CPC .......... *H04L 63/0861* (2013.01); *G06F 21/32* (2013.01); *G06K 9/00926* (2013.01); *H04L 9/085* (2013.01); *H04L 9/3231* (2013.01)

(58) Field of Classification Search
CPC ......................... H04L 63/0861; H04L 9/085
See application file for complete search history.

(56) References Cited

U.S. PATENT DOCUMENTS

| | | | | |
|---|---|---|---|---|
| 8,242,881 B2* | 8/2012 | Uno | .............. | G06K 9/00926 |
| | | | | 340/5.52 |
| 8,379,936 B2* | 2/2013 | Sato | .............. | G06K 9/00885 |
| | | | | 382/115 |

(Continued)

FOREIGN PATENT DOCUMENTS

| | | |
|---|---|---|
| KR | 10-2004-0082674 | 9/2004 |
| KR | 10-2010-0029019 | 3/2010 |

*Primary Examiner* — Ali Shayanfar
(74) *Attorney, Agent, or Firm* — Brinks Gilson & Lione

(57) ABSTRACT

In a biometric information management method, a first comparison result is acquired by comparing first biometric input information with registered first biometric authentication information and a second comparison result is acquired by comparing second biometric input information with registered second biometric authentication information. Further, satisfaction or non-satisfaction of a predetermined authentication information compensation condition is determined based on the first comparison result and the second comparison result. If a result of the determining satisfies the authentication information compensation condition, the first biometric authentication information is compensated by using the first biometric input information or the second biometric authentication information is compensated by using the second biometric input information.

8 Claims, 3 Drawing Sheets

(56) References Cited

U.S. PATENT DOCUMENTS

| | | | | |
|---|---|---|---|---|
| 2006/0193503 A1* | 8/2006 | Bauchspies | G06K 9/00087 | 382/124 |
| 2008/0040614 A1* | 2/2008 | Abe | G06K 9/00885 | 713/186 |
| 2010/0061600 A1* | 3/2010 | Niinuma | G06F 21/32 | 382/115 |
| 2010/0257102 A1* | 10/2010 | Perlman | G06Q 20/04 | 705/75 |
| 2011/0138187 A1* | 6/2011 | Kaga | G06F 21/32 | 713/186 |
| 2012/0150450 A1* | 6/2012 | Monden | G06F 21/32 | 702/19 |
| 2013/0174243 A1* | 7/2013 | Inatomi | H04L 9/3231 | 726/7 |
| 2014/0016833 A1* | 1/2014 | Ide | G06K 9/00926 | 382/115 |
| 2015/0046990 A1* | 2/2015 | Oberheide | G06F 21/32 | 726/6 |
| 2015/0347857 A1* | 12/2015 | Li | G06K 9/00 | 382/116 |

\* cited by examiner

BIOMETRIC INFORMATION MANAGEMENT METHOD AND BIOMETRIC INFORMATION MANAGEMENT APPARATUS

CROSS-REFERENCE TO RELATED APPLICATIONS

This application claims priority to Korean Patent Application No. 10-2015-0111640 filed on Aug. 7, 2015, the entire contents of which is incorporated herein by reference.

TECHNICAL FIELD

The present disclosure relates to biometric information management and, more particularly, to a method and apparatus for managing biometric authentication information by updating or adding biometric authentication information registered for multiple biometric recognition.

BACKGROUND

As well-known in the art, features currently used in a human recognition system include a face, a voice, a hand shape, an iris, a vein, a fingerprint and so forth. Studies have been actively conducted on the respective features.

It is important that the biometric information such as a face, a voice, a hand shape, an iris, a vein, a fingerprint or the like used in human recognition is unchanging and constant.

However, when biometric information is acquired through the use of a camera or other sensors, the biometric information may be largely changed depending on the variations in an acquisition environment and a biometric condition. This may become a major cause of occurrence of an authentication failure or an erroneous authentication success. Acquisition environment changing factors include an illumination, a position, a temperature, and so forth. Biometric condition changing factors include destruction of a fingerprint due to eczema, a change in facial expressions, a difference in iris images attributable to the presence or absence of spectacles, and so forth.

According to the related art, in order to cope with the biometric information changing factors, there has been used a method of compensating initially-registered biometric authentication information on an authentication subject by updating the initially-registered biometric information with information more favorable to authentication or by adding the information more favorable to authentication to the initially-registered biometric information (see, e.g., Korean Patent Nos. 1087833 and 1297736).

In this biometric authentication information compensation method, it is necessary to first identify the identity of an authentication subject with a certain level of accuracy prior to updating or adding the biometric information.

To this end, the identity of an authentication subject may be identified through a relatively-safe authentication procedure such as the input of a password, the presence of a manager, or the like. Thereafter, the registered biometric authentication information may be compensated by update or addition. However, this poses a problem in that a user is asked to take an additional action. Another problem is posed in that the registered biometric authentication information cannot be frequently compensated in real time, eventually reducing the effectiveness.

Alternatively, when human recognition is successfully performed with an extremely high level of accuracy, it may be possible to use a self-compensation method in which the registered biometric authentication information is updated or added with currently-inputted biometric input information. However, according to the self-compensation method, the success in the human recognition with an extremely high level of accuracy means that the similarity degree between the inputted biometric input information and the registered biometric authentication information is high. Thus, there is a problem in that even if the registered biometric authentication information is updated or added with the biometric input information, it is difficult to expect significant improvement of authentication performance.

SUMMARY

In view of the aforementioned problems inherent in the related art, the present disclosure provides a biometric information management method and a biometric information management apparatus capable of updating or adding registered biometric authentication information based on a result of comparison of two or more kinds of biometric information. The present disclosure has been achieved in a project (WC300 project) carried out by the present inventors.

The objects are not limited to the aforementioned ones. Other objects not referred to herein will be apparently understood from the following descriptions by a person having an ordinary knowledge in the field to which the present disclosure pertains.

In accordance with an aspect, there is provided a biometric information management method, including: acquiring a first comparison result by comparing first biometric input information with registered first biometric authentication information; acquiring a second comparison result by comparing second biometric input information with registered second biometric authentication information; determining satisfaction or non-satisfaction of a predetermined authentication information compensation condition based on the first comparison result and the second comparison result; and compensating the first biometric authentication information by using the first biometric input information or compensating the second biometric authentication information by using the second biometric input information, when the authentication information compensation condition is satisfied in said determining.

The predetermined authentication information compensation condition may include a first biometric authentication information compensation condition which is satisfied when biometric authentication based on the second comparison result succeeds and biometric authentication based on the first comparison result fails, and a second biometric authentication information compensation condition which is satisfied when biometric authentication based on the first comparison result succeeds and biometric authentication based on the second comparison result fails, the first biometric authentication information may be compensated based on the first biometric input information when the first biometric authentication information compensation condition is satisfied, and the second biometric authentication information may be compensated based on the second biometric input information when the second biometric authentication information compensation condition is satisfied.

The process of acquiring the first comparison result may include calculating a first similarity degree between the first biometric input information and the first biometric authentication information, the process of acquiring the second comparison result may include calculating a second similarity degree between the second biometric input information and the second biometric authentication information, and the determining process may include determining satisfaction or non-satisfaction of the authentication information compensation condition based on a result of comparison of the first similarity degree with a predetermined first authentication threshold value and a result of comparison of the second similarity degree with a predetermined second authentication threshold value.

The process of acquiring the first comparison result may include calculating a first similarity degree between the first biometric input information and the first biometric authentication information, the process of acquiring the second comparison result may include calculating a second similarity degree between the second biometric input information and the second biometric authentication information, and the determining process may include calculating a combined similarity degree based on the first similarity degree and the second similarity degree and determining satisfaction or non-satisfaction of the authentication information compensation condition based on a result of comparison of the combined similarity degree with a predetermined combination threshold value.

The determining process may include determining satisfaction or non-satisfaction of the authentication information compensation condition in view of a result of comparison of the first similarity degree with a predetermined first authentication threshold value and a result of comparison of the second similarity degree with a predetermined second authentication threshold value.

The determining process may include determining authentication of the first biometric input information to be successful if the first similarity degree is equal to or larger than the first authentication threshold value and determining authentication of the second biometric input information to be successful if the second similarity degree is equal to or larger than the second authentication threshold value.

The authentication information compensation condition may include a first biometric authentication compensation condition which is satisfied when the second similarity degree is equal to or larger than the second authentication threshold value and the first similarity degree is equal to or larger than a first compensation threshold value smaller than the first authentication threshold value, and a second biometric authentication compensation condition which is satisfied when the first similarity degree is equal to or larger than the first authentication threshold value and the second similarity degree is equal to or larger than a second compensation threshold value smaller than the second authentication threshold value.

In accordance with another aspect, there is provided a computer-readable storage medium including computer executable instructions, wherein the instructions, when executed by a processor, cause the processor to perform the biometric information management method of claim 1.

In accordance with still another aspect, there is provided a biometric information management apparatus, including: a first comparison unit configured to acquire a first comparison result by comparing first biometric input information with registered first biometric authentication information; a second comparison unit configured to acquire a second comparison result by comparing second biometric input information with registered second biometric authentication information; a determination part configured to determine satisfaction or non-satisfaction of a predetermined authentication information compensation condition based on the first comparison result and the second comparison result; and an information compensation part configured to, when a result of the determination satisfies the authentication information compensation condition, compensate the first biometric authentication information by using the first biometric input information or compensate the second biometric authentication information by using the second biometric input information.

The predetermined authentication information compensation condition may include a first biometric authentication information compensation condition which is satisfied when biometric authentication based on the second comparison result succeeds and biometric authentication based on the first comparison result fails, and a second biometric authentication information compensation condition which is satisfied when biometric authentication based on the first comparison result succeeds and biometric authentication based on the second comparison result fails, and the information compensation part may be configured to compensate the first biometric authentication information based on the first biometric input information when the first biometric authentication information compensation condition is satisfied, and to compensate the second biometric authentication information based on the second biometric input information when the second biometric authentication information compensation condition is satisfied.

The first comparison unit may be configured to calculate a first similarity degree between the first biometric input information and the first biometric authentication information, the second comparison unit may be configured to calculate a second similarity degree between the second biometric input information and the second biometric authentication information, and the determination part may be configured to determine satisfaction or non-satisfaction of the authentication information compensation condition based on a result of comparison of the first similarity degree with a predetermined first authentication threshold value and a result of comparison of the second similarity degree with a predetermined second authentication threshold value.

The first comparison unit may be configured to calculate a first similarity degree between the first biometric input information and the first biometric authentication information, the second comparison unit may be configured to calculate a second similarity degree between the second biometric input information and the second biometric authentication information, and the determination part may be configured to calculate a combined similarity degree based on the first similarity degree and the second similarity degree and to determine satisfaction or non-satisfaction of the authentication information compensation condition based on a result of comparison of the combined similarity degree with a predetermined combination threshold value.

The determination part may be configured to determine satisfaction or non-satisfaction of the authentication information compensation condition in view of a result of comparison of the first similarity degree with a predetermined first authentication threshold value and a result of comparison of the second similarity degree with a predetermined second authentication threshold value.

The determination part may be configured to determine authentication of the first biometric input information to be successful when the first similarity degree is equal to or larger than the first authentication threshold value, and to determine authentication of the second biometric input information to be successful when the second similarity degree is equal to or larger than the second authentication threshold value.

The authentication information compensation condition may include a first biometric authentication compensation condition which is satisfied when the second similarity degree is equal to or larger than the second authentication threshold value and the first similarity degree is equal to or larger than a first compensation threshold value smaller than the first authentication threshold value, and a second biometric authentication compensation condition which is satisfied when the first similarity degree is equal to or larger than the first authentication threshold value and the second similarity degree is equal to or larger than a second compensation threshold value smaller than the second authentication threshold value.

With such configurations, a compensation process of updating or adding registered biometric authentication information is performed based on a result of comparison of two or more kinds of biometric information.

Thus, when compensating biometric authentication information for human recognition using specific biometric information, it is possible to reflect a result of human recognition using other biometric information. For example, a compensation process of updating or adding registered biometric authentication information may be performed using the biometric input information of a user whose authentication is failed but whose identity is identified by other biometric recognition. When fingerprint authentication succeeds and face authentication fails in a human recognition method which performs fingerprint recognition and face recognition together, a compensation process of updating or adding registered face authentication information can be performed using authentication-failed face input information.

If similarly-modified biometric information is measured and inputted after the compensation of the biometric authentication information, authentication may succeed even when the probability of occurrence of authentication failure is high in the related art. Accordingly, the probability of authentication failure is reduced.

Thus, the human recognition system using two or more kinds of biometric information has an effect of improving authentication performance, because the mutually-differing biometric authentication results are compensated with each other.

DETAILED DESCRIPTION

Advantages, features and methods for achieving them will become apparent from embodiments which will be described later in detail with reference to the accompanying drawings. However, the present disclosure is not limited to the embodiments described herein below but may be implemented in many different forms. The embodiments are provided to make complete the present disclosure and to completely inform the scope of the present disclosure to a person having an ordinary knowledge in the field to which the present disclosure pertains. The present disclosure is defined only by the claims.

In describing the embodiments of the present disclosure, the detailed descriptions of well-known functions or configurations will be omitted if it is determined that the detailed descriptions of well-known functions or configurations may unnecessarily make obscure the spirit of the present disclosure. The terms to be described later are defined in view of the functions exercised in the embodiments of the present disclosure and may vary depending on the intention of a user or an operator and the practice. Thus, the definition of terms shall be made based on the overall contents of the subject specification.

Figure 1:
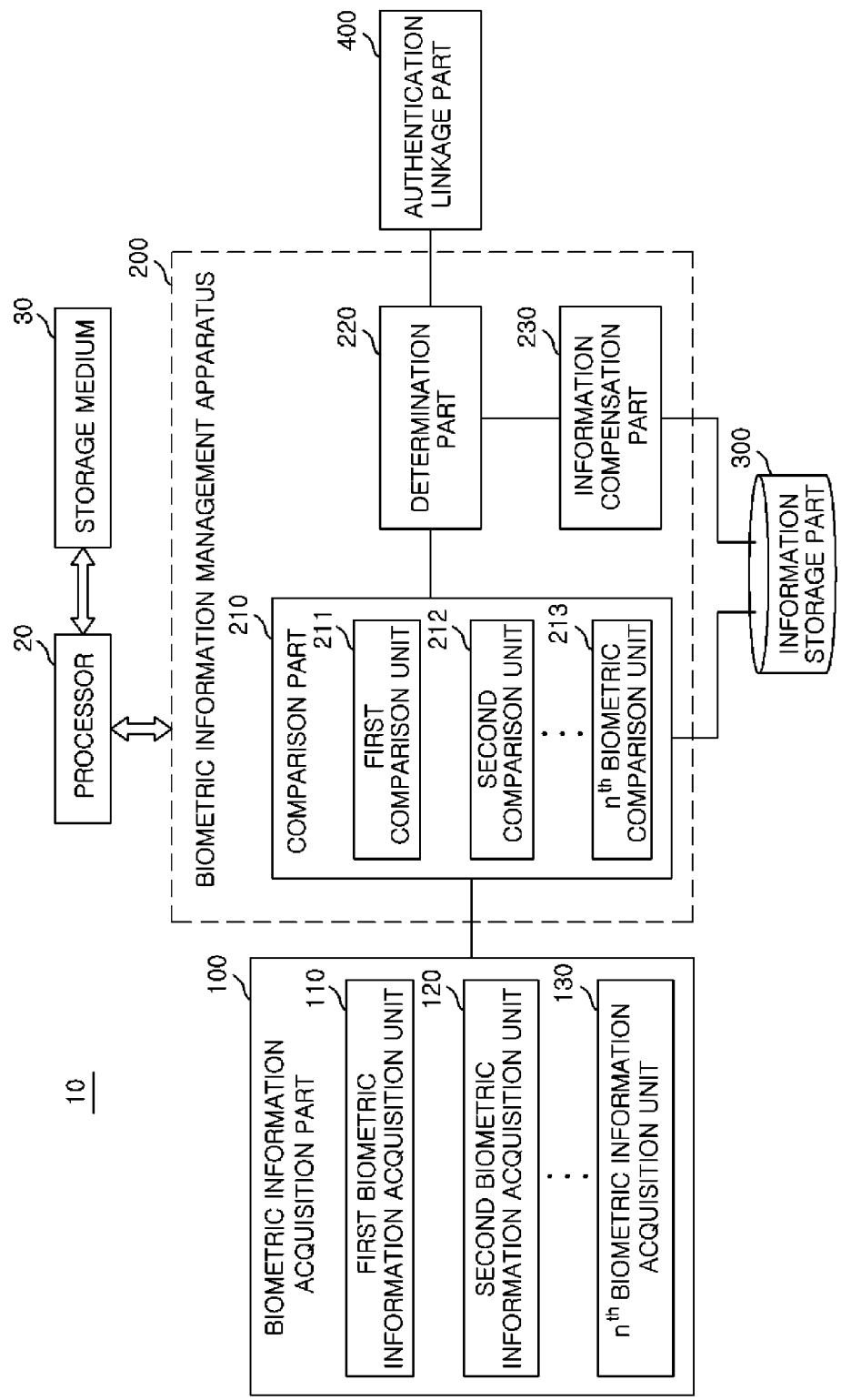
FIG. 1 is a configuration view of a human recognition system including a biometric information management apparatus according to one embodiment.

FIG. 1 is a configuration view of a human recognition system including a biometric information management apparatus according to one embodiment.

A human recognition system 10 according to one embodiment includes a biometric information acquisition part 100, a biometric information management apparatus 200, an information storage part 300 and an authentication linkage part 400.

The biometric information acquisition part 100 includes a first biometric information acquisition unit 110, a second biometric information acquisition unit 120 and an $n^{th}$ biometric information acquisition unit 130, which are configured to acquire one or more kinds of biometric information such as a face, a voice, a hand shape, an iris, a vein, a fingerprint and the like. The first biometric information acquisition unit 110, the second biometric information acquisition unit 120 and the $n^{th}$ biometric information acquisition unit 130 acquire biometric information and provide biometric input information to a comparison part 210 of the biometric information management apparatus 200. In FIG. 1, there is illustrated a case where the biometric information acquisition part 100 includes three biometric information acquisition units 110, 120 and 130. However, the biometric information acquisition part 100 may include two or more biometric information acquisition units in total.

The biometric information management apparatus 200 includes a comparison part 210, a determination part 220 and an information compensation part 230.

The comparison part 210 includes a first comparison unit 211, a second comparison unit 212 and an $n^{th}$ comparison unit 213, which are configured to compare the biometric input information provided from the biometric information acquisition part 100 with the biometric authentication information registered in the information storage part 300. In FIG. 1, there is illustrated a case where the comparison part 210 includes three comparison units 211, 212 and 213. However, the comparison part 210 may include two or more comparison units in total.

The first comparison unit 211 provides the determination part 220 with a first comparison result acquired by comparing the first biometric input information provided from the first biometric information acquisition unit 110 with the first biometric authentication information registered in the information storage part 300. The second comparison unit 212 provides the determination part 220 with a second comparison result acquired by comparing the second biometric input information provided from the second biometric information acquisition unit 120 with the second biometric authentication information registered in the information storage part 300. The $n^{th}$ comparison unit 213 provides the determination part 220 with an $n^{th}$ comparison result acquired by comparing the $n^{th}$ biometric input information provided from the $n^{th}$ biometric information acquisition unit 130 with the $n^{th}$ biometric authentication information registered in the information storage part 300. For example, the first comparison unit 211, the second comparison unit 212 and the $n^{th}$ comparison unit 213 may calculate a similarity degree between the biometric input information and the registered biometric authentication information and may acquire a comparison result.

The determination part 220 may determine whether the first comparison result, the second comparison result and the $n^{th}$ comparison result satisfy a predetermined authentication information compensation condition. The determination part 220 may provide the information compensation part 230 or the authentication linkage part 400 with a human recognition result of authentication success or authentication failure.

The determination part 220 receives a first similarity degree, which is calculated by comparing the first biometric input information with the registered first biometric authentication information, from the first comparison unit 211. The determination part 220 receives a second similarity degree, which is calculated by comparing the second biometric input information with the registered second biometric authentication information, from the second comparison unit 212. The determination part 220 receives an $n^{th}$ similarity degree, which is calculated by comparing the $n^{th}$ biometric input information with the registered $n^{th}$ biometric authentication information, from the $n^{th}$ comparison unit 213.

The determination part 220 may determine the satisfaction or non-satisfaction of the predetermined authentication information compensation condition, based on a result of comparison of the first similarity degree with a predetermined first authentication threshold value, a result of comparison of the second similarity degree with a predetermined second authentication threshold value and a result of comparison of the $n^{th}$ similarity degree with a predetermined $n^{th}$ authentication threshold value.

Furthermore, the determination part 220 may calculate a combined similarity degree using the first similarity degree, the second similarity degree and the $n^{th}$ similarity degree. Then, the determination part 220 may determine the satisfaction or non-satisfaction of the predetermined authentication information compensation condition, based on a result of comparison of the calculated combined similarity degree with a predetermined combination threshold value. The combined similarity degree may be found using a maximum value among the first similarity degree, the second similarity degree and the $n^{th}$ similarity degree or using a machine-learning-based classification method.

Furthermore, if the combined similarity degree is equal to or larger than the predetermined combination threshold value, the determination part 220 may determine the satisfaction or non-satisfaction of the predetermined authentication information compensation condition in view of at least one of the result of comparison of the first similarity degree with the predetermined first authentication threshold value, the result of comparison of the second similarity degree with the predetermined second authentication threshold value and the result of comparison of the $n^{th}$ similarity degree with the predetermined $n^{th}$ authentication threshold value.

Furthermore, when determining the satisfaction or non-satisfaction of the predetermined authentication information compensation condition, the determination part 220 may further consider a first compensation threshold value, a second compensation threshold value and an $n^{th}$ compensation threshold value in addition to the first authentication threshold value, the second authentication threshold value and the $n^{th}$ authentication threshold value. Specifically, if the first similarity degree calculated from the first biometric input information is equal to or larger than the first authentication threshold value and if the second similarity degree calculated from the second biometric input information is equal to or larger than the second compensation threshold value, the determination part 220 may determine that a compensation condition for compensating the second biometric authentication information based on the second biometric input information is satisfied. Similarly, if the second similarity degree calculated from the second biometric input information is equal to or larger than the second authentication threshold value and if the first similarity degree calculated from the first biometric input information is equal to or larger than the first compensation threshold value, the determination part 220 may determine that a compensation condition for compensating the first biometric authentication information based on the first biometric input information is satisfied. At this time, the first compensation threshold value may be a value smaller than the first authentication threshold value. The second compensation threshold value may be a value smaller than the second authentication threshold value. The $n^{th}$ compensation threshold value may be a value smaller than the $n^{th}$ authentication threshold value. By providing the compensation threshold values in addition to the authentication threshold values as described above, it is possible to check once again the similarity degree of the biometric input information to be compensated. This makes it possible to increase the reliability of the biometric authentication information to be compensated.

If the result of the determination made by the determination part 220 indicates that the predetermined authentication information compensation condition is satisfied, the information compensation part 230 may update and compensate the first biometric authentication information using the first biometric input information. Alternatively, if the result of the determination made by the determination part 220 indicates that the predetermined authentication information compensation condition is satisfied, the information compensation part 230 may compensate the first biometric authentication information by adding a part or the entirety of the first biometric input information to the first biometric authentication information. Similarly, the second biometric authentication information may be compensated using the second biometric input information. The $n^{th}$ biometric authentication information may be compensated using the $n^{th}$ biometric input information.

Depending on the result of the determination made by the determination part 220, the information compensation part 230 selects the biometric input information to be used in compensating the biometric authentication information from the first biometric input information, the second biometric input information and the $n^{th}$ biometric input information. For example, the determination part 220 may compare the first similarity degree with the predetermined first authentication threshold value. Based on the human recognition result of authentication success or authentication failure, the determination part 220 may notify the satisfaction or non-satisfaction of the compensation condition of the second biometric authentication information to the information compensation part 230. Furthermore, the determination part 220 may compare the second similarity degree with the predetermined second authentication threshold value. Based on the human recognition result of authentication success or authentication failure, the determination part 220 may notify the satisfaction or non-satisfaction of the compensation condition of the first biometric authentication information to the information compensation part 230. Then, the information compensation part 230 may compensate any of the first biometric authentication information and the second biometric authentication information, which satisfies the predetermined authentication information compensation condition.

The first authentication threshold value, the second authentication threshold value, the $n^{th}$ authentication threshold value, the combination threshold value, the first compensation threshold value, the second compensation threshold value, the $n^{th}$ compensation threshold value and the like are stored in the information storage part 300 so that the first comparison unit 211, the second comparison unit 212 and the $n^{th}$ comparison unit 213 can compare the stored values with the similarity degrees or the combined similarity degree. In addition, a function for calculating the combined similarity degree and various kinds of reference values and data required in the authentication process may be stored in the information storage part 300.

The authentication linkage part 400 may be realized as various kinds of loads operated in accordance with the biometric authentication result of the determination part 220. For example, if the human recognition system 10 is provided with an access control system, the authentication linkage part 400 may be realized as an actuator for opening and closing a gate depending on the biometric authentication result.

Figure 2:
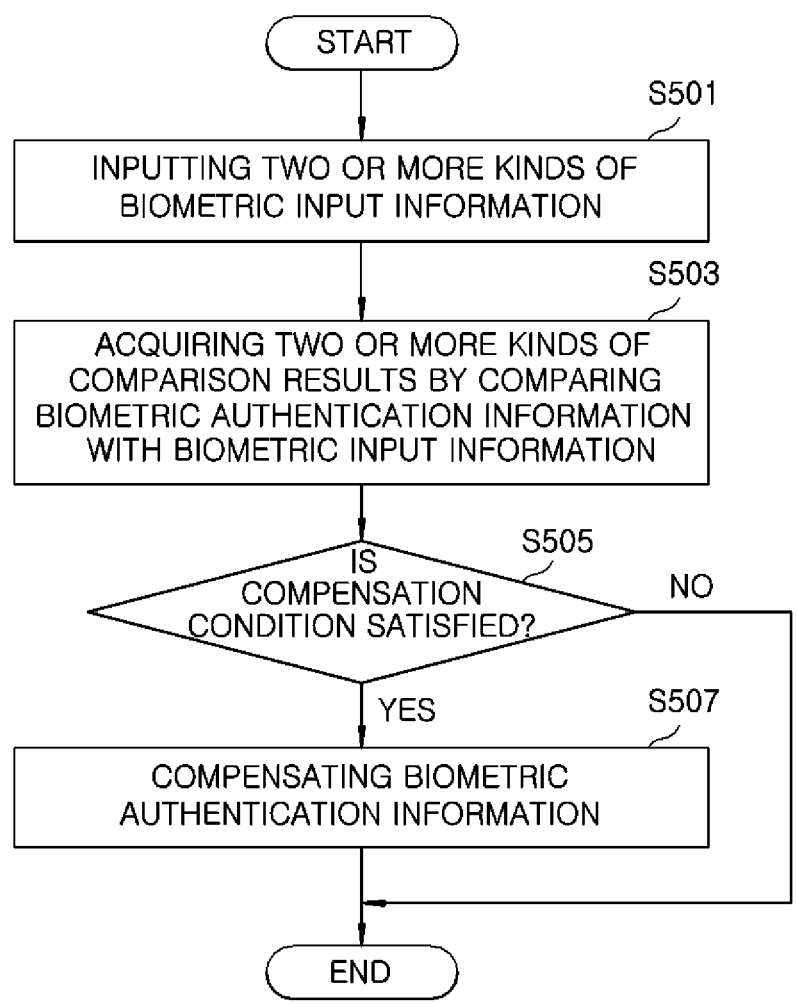
FIG. 2 is a flowchart for explaining a biometric information management method according to one embodiment.

FIG. 2 is a flowchart for explaining a biometric information management method according to one embodiment.

The biometric information management method according to one embodiment includes a step S501 of receiving two more kinds of biometric input information including first biometric input information and second biometric input information.

The biometric information management method further includes a step S503 of acquiring two or more kinds of comparison results by comparing two or more kinds of biometric input information with different kinds of predetermined biometric authentication information. For example, a first comparison result is acquired by comparing first biometric input information with registered first biometric authentication information. Furthermore, a second comparison result is acquired by comparing second biometric input information with registered second biometric authentication information.

The biometric information management method further includes a step S505 of determining whether the two or more kinds of comparison results satisfy a predetermined authentication information compensation condition. In the present embodiment, it may be possible to determine whether a first comparison result and a second comparison result satisfy the predetermined authentication information compensation condition.

The predetermined authentication information compensation condition used in step S505 may be implemented in many different forms. A value calculated by comparing the first biometric input information with the registered first biometric authentication information is referred to as a first similarity degree. A value calculated by comparing the second biometric input information with the registered second biometric authentication information is referred to as a second similarity degree. A value calculated by comparing the $n^{th}$ biometric input information with the registered $n^{th}$ biometric authentication information is referred to as an $n^{th}$ similarity degree. For example, the satisfaction or non-satisfaction of the predetermined authentication information compensation condition may be determined based on a result of comparison of the first similarity degree with a predetermined first authentication threshold value, a result of comparison of the second similarity degree with a predetermined second authentication threshold value and a result of comparison of the $n^{th}$ similarity degree with a predetermined $n^{th}$ authentication threshold value.

At step S505, a combined similarity degree may be calculated using the first similarity degree, the second similarity degree and the $n^{th}$ similarity degree. Thereafter, the satisfaction or non-satisfaction of the predetermined authentication information compensation condition may be determined based on a result of comparison of the calculated combined similarity degree with a predetermined combination threshold value. The combined similarity degree may be found using a maximum value among the first similarity degree, the second similarity degree and the $n^{th}$ similarity degree or using a machine-learning-based classification method.

At step S505, if the combined similarity degree is equal to or larger than the predetermined combination threshold value, the satisfaction or non-satisfaction of the predetermined authentication information compensation condition may be determined in view of at least one of the result of comparison of the first similarity degree with the predetermined first authentication threshold value, the result of comparison of the second similarity degree with the predetermined second authentication threshold value and the result of comparison of the nth similarity degree with the predetermined nth authentication threshold value.

At step S505, when determining the satisfaction or non-satisfaction of the predetermined authentication information compensation condition, a first compensation threshold value, a second compensation threshold value and an $n^{th}$ compensation threshold value may be further considered in addition to the first authentication threshold value, the second authentication threshold value and the $n^{th}$ authentication threshold value. The first compensation threshold value may be a value smaller than the first authentication threshold value. The second compensation threshold value may be a value smaller than the second authentication threshold value. The $n^{th}$ compensation threshold value may be a value smaller than the $n^{th}$ authentication threshold value.

The biometric information management method further includes a step S507 of, if the result of determination satisfies the predetermined authentication information compensation condition, compensating at least one of the two or more kinds of biometric authentication information by using the corresponding kinds of biometric input information. For example, the first biometric authentication information may be compensated by using the first biometric input information. The first biometric authentication information may be updated and compensated by using the first biometric input information. Alternatively, the first biometric authentication information may be compensated by adding a part or the entirety of the first biometric input information as the first biometric authentication information. Similarly, the second biometric authentication information may be compensated using the second biometric input information.

Figure 3:
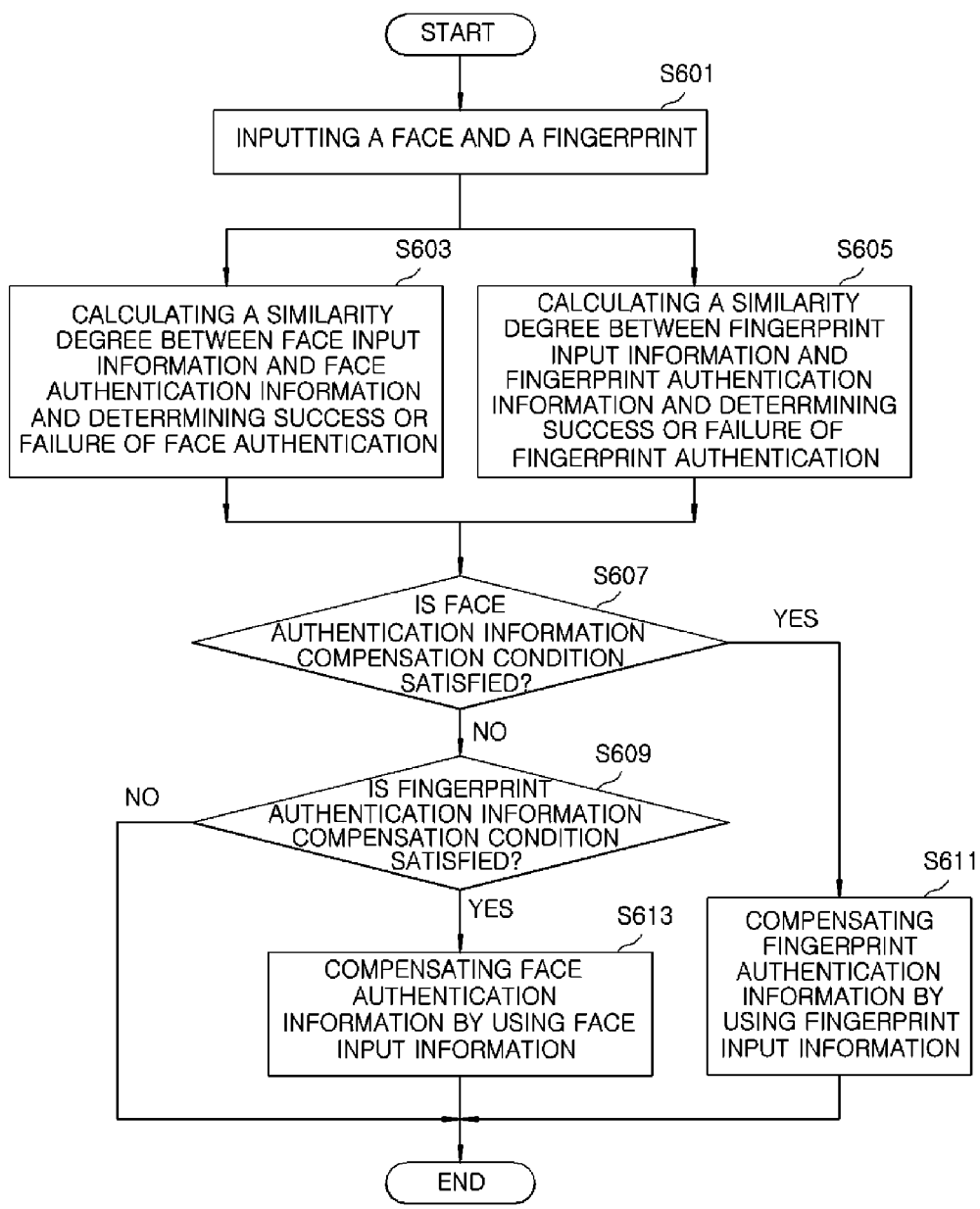
FIG. 3 is a flowchart illustrating a case where the biometric information management method according to one embodiment is applied to a human recognition system using face recognition and fingerprint recognition.

FIG. 3 is a flowchart illustrating a case where the biometric information management method according to one embodiment is applied to a human recognition system using face recognition and fingerprint recognition.

A face/fingerprint information management method according to one embodiment includes a step S601 of receiving face input information and fingerprint input information.

The face/fingerprint information management method further includes a step S603 of calculating a first similarity degree by comparing the face input information with registered face authentication information and determining face authentication success or face authentication failure based on a result of comparison of the first similarity degree with a predetermined first authentication threshold value.

The face/fingerprint information management method further includes a step S605 of calculating a second similarity degree by comparing the fingerprint input information with registered fingerprint authentication information and determining fingerprint authentication success or fingerprint authentication failure based on a result of comparison of the second similarity degree with a predetermined second authentication threshold value.

The face/fingerprint information management method further includes a step S607 of determining satisfaction or non-satisfaction of a face authentication information compensation condition.

The face/fingerprint information management method further includes a step S609 of determining satisfaction or non-satisfaction of a fingerprint authentication information compensation condition.

The face/fingerprint information management method further includes a step S611 of, in the case of the face authentication failure and the fingerprint authentication success, compensating the face authentication information by update or addition using the face input information.

The face/fingerprint information management method further includes a step S613 of, in the case of the face authentication success and the fingerprint authentication failure, compensating the fingerprint authentication information by update or addition using the fingerprint input information.

A biometric authentication process using the human recognition system including the biometric information management apparatus according to one embodiment of the present disclosure will be described in more detail with reference to FIGS. 1 to 3.

First, the biometric information acquisition part 100 acquires two or more kinds of biometric information such as a face, a voice, a hand shape, an iris, a vein, a fingerprint and the like and provides the acquired biometric input information to the comparison part 210 of the biometric information management apparatus 200 (S501).

For example, the first biometric information acquisition unit 110 may provide face input information to the first comparison unit 211, and the second biometric information acquisition unit 120 may provide fingerprint input information to the second comparison unit 212 (S601). Furthermore, the $n^{th}$ biometric information acquisition unit 130 may provide $n^{th}$ biometric input information to the $n^{th}$ comparison unit 213.

Then, the comparison part 210 acquires two or more kinds of comparison results by comparing two or more kinds of biometric input information with different kinds of predetermined biometric authentication information (S503).

For example, the first comparison unit 211 may calculate a first similarity degree by comparing the face input information with the face authentication information registered in the information storage part 300 (S603). The second comparison unit 211 may calculate a second similarity degree by comparing the fingerprint input information with the fingerprint authentication information registered in the information storage part 300 (S605). In addition, the $n^{th}$ comparison unit 213 may calculate an $n^{th}$ similarity degree by comparing the $n^{th}$ input information with the $n^{th}$ authentication information registered in the information storage part 300.

The determination part 220 receives comparison results from the comparison part 210. For example, the comparison part 210 provides the first similarity degree, the second similarity degree and the $n^{th}$ similarity degree to the determination part 220.

Then, the determination part 220 may determine whether the first similarity degree, the second similarity degree and the $n^{th}$ similarity degree provided by the comparison part 210 satisfy a predetermined authentication information compensation condition. The determination part 220 may provide a human recognition result of authentication success or authentication failure to the information compensation part 230 or the authentication linkage part 400.

In this regard, the determination part 220 may determine the satisfaction or non-satisfaction of the predetermined authentication information compensation condition based on a result of comparison of the first similarity degree with a predetermined first authentication threshold value, a result of comparison of the second similarity degree with a predetermined second authentication threshold value and a result of comparison of the $n^{th}$ similarity degree with a predetermined $n^{th}$ authentication threshold value.

Furthermore, the determination part 220 may calculate a combined similarity degree using the first similarity degree, the second similarity degree and the $n^{th}$ similarity degree. Then, the determination part 220 may determine the satisfaction or non-satisfaction of the predetermined authentication information compensation condition, based on a result of comparison of the calculated combined similarity degree with a predetermined combination threshold value. For example, the combined similarity degree may be calculated using a function stored in the information storage part 300. At this time, the combined similarity degree may be calculated by applying different weight values to the first similarity degree, the second similarity degree and the $n^{th}$ similarity degree. Alternatively, the combined similarity degree may be found using a maximum value among the first similarity degree, the second similarity degree and the $n^{th}$ similarity degree or using a machine-learning-based classification method.

Furthermore, if the combined similarity degree is equal to or larger than the predetermined combination threshold value, the determination part 220 may determine the satisfaction or non-satisfaction of the predetermined authentication information compensation condition in view of at least one of the result of comparison of the first similarity degree with the predetermined first authentication threshold value, the result of comparison of the second similarity degree with the predetermined second authentication threshold value and the result of comparison of the $n^{th}$ similarity degree with the predetermined $n^{th}$ authentication threshold value.

Furthermore, when determining the satisfaction or non-satisfaction of the predetermined authentication information compensation condition, the determination part 220 may further consider a first compensation threshold value, a second compensation threshold value and an $n^{th}$ compensation threshold value in addition to the first authentication threshold value, the second authentication threshold value and the $n^{th}$ authentication threshold value. The first compensation threshold value may be a value smaller than the first authentication threshold value. The second compensation threshold value may be a value smaller than the second authentication threshold value. The $n^{th}$ compensation threshold value may be a value smaller than the $n^{th}$ authentication threshold value (S505).

For example, if at least one of the authentication results using two or more kinds of biometric information is determined to be authentication success, the determination part 220 may determine that the predetermined authentication information compensation condition is satisfied. When the authentication result using the face information among different kinds of biometric information is determined to be authentication failure and when the authentication result using the fingerprint information among different kinds of biometric information is determined to be authentication success, the determination part 220 may determine that a condition for compensating the face authentication information is satisfied. Alternatively, when the authentication result using the face information is determined to be authentication success and when the authentication result using the fingerprint information is determined to be authentication failure, the determination part 220 may determine that a condition for compensating the fingerprint authentication information is satisfied (S607 and S609).

In the case of using the face authentication and the fingerprint authentication as described above, the determination part 220 may determine that the authentication with respect to the face input information is successful if the first similarity degree calculated in step S603 is equal to or larger than the predetermined first authentication threshold value. The determination part 220 may determine that the authentication with respect to the fingerprint input information is successful if the second similarity degree calculated in step S605 is equal to or larger than the predetermined second authentication threshold value.

At steps S607 and S609, a face authentication compensation condition may be further considered in addition to the face authentication condition, or a fingerprint authentication compensation condition may be further considered in addition to the fingerprint authentication condition. For example, a first compensation threshold value smaller than the first authentication threshold value may be set. A case where the second similarity degree is equal to or larger than the second authentication threshold value and where the first similarity degree is equal to or larger than the first compensation threshold value may be used as the face authentication compensation condition. Furthermore, a second compensation threshold value smaller than the second authentication threshold value may be set. A case where the first similarity degree is equal to or larger than the first authentication threshold value and where the second similarity degree is equal to or larger than the second compensation threshold value may be used as the fingerprint authentication compensation condition.

Next, if the result of the determination made by the determination part 220 satisfies the predetermined authentication information compensation condition, the information compensation part 230 may compensate the first biometric authentication information using the first biometric input information. The information compensation part 230 may compensate the second biometric authentication information using the second biometric input information. The information compensation part 230 may compensate the $n^{th}$ biometric authentication information using the $n^{th}$ biometric input information.

According to the result of the determination made by the determination part 220, the information compensation part 230 selects the biometric input information to be used in compensating the biometric authentication information from the first biometric input information, the second biometric input information and the $n^{th}$ biometric input information. For example, the determination part 220 may compare the first similarity degree with the predetermined first authentication threshold value and may provide the human recognition result of authentication success or authentication failure to the information compensation part 230. Furthermore, the determination part 220 may compare the second similarity degree with the predetermined second authentication threshold value and may provide the human recognition result of authentication success or authentication failure to the information compensation part 230. Then, the information compensation part 230 may compensate the biometric authentication information relating to authentication failure among the first biometric authentication information and the second biometric authentication information (S507).

For example, if the authentication result using the face information among different kinds of biometric information is determined to be authentication failure and if the authentication result using the fingerprint information is determined to be authentication success, the information compensation part 230 may perform a compensation process of updating or adding the face authentication information registered in the information storage part 300 using the face input information (S611). Alternatively, if the authentication result using the face information among different kinds of biometric information is determined to be authentication success and if the authentication result using the fingerprint information is determined to be authentication failure, the information compensation part 230 may perform a compensation process of updating or adding the fingerprint authentication information registered in the information storage part 300 using the fingerprint input information (S613).

As described above, the predetermined authentication information compensation condition used in steps S607 and S609 may include a first biometric authentication information compensation condition capable of performing step S611 and a second biometric authentication information compensation condition capable of performing step S613. The first biometric authentication information compensation condition is satisfied if the biometric authentication based on the second comparison result in step S605 succeeds and if the biometric authentication based on the first comparison result in step S603 fails. If the first biometric authentication information compensation condition is satisfied in this way, the face authentication information is compensated in step S611 based on the face input information. On the other hand, the second biometric authentication information compensation condition is satisfied if the biometric authentication based on the first comparison result in step S603 succeeds and if the biometric authentication based on the second comparison result in step S605 fails. If the second biometric authentication information compensation condition is satisfied in this way, the fingerprint authentication information is compensated in step S613 based on the fingerprint input information.

When the information compensation part 230 compensates the face authentication information or the fingerprint authentication information, if the face authentication compensation condition is further considered in addition to the face authentication condition or if the fingerprint authentication compensation condition is further considered in addition to the fingerprint authentication condition as exemplarily described in steps S607 and S609, it is possible to enhance the reliability of the face authentication compensation information and the fingerprint authentication compensation information. In this case, if the first similarity degree calculated in step S603 with respect to the authentication-failed face input information is excessively low, there is a high probability of occurrence of an error. Thus, the fingerprint authentication compensation condition is not satisfied and the compensation with respect to the fingerprint authentication information is not performed in step S613. If the second similarity degree calculated in step S605 with respect to the authentication-failed fingerprint input information is excessively low, there is a high probability of occurrence of an error. Thus, the face authentication compensation condition is not satisfied and the compensation with respect to the face authentication information is not performed in step S611.

As described hereinabove, according to the embodiment of the present disclosure, the compensation process of updating or adding the registered biometric authentication information is performed based on results of comparison of two or more kinds of biometric information obtained by the human recognition system using two or more kinds of biometric information.

Thus, when compensating the biometric authentication information for human recognition using specific biometric information, it is possible to reflect a result of human recognition using other biometric information. For example, a compensation process of updating or adding the registered biometric authentication information may be performed using the biometric input information of a user whose authentication is failed but whose identity is identified by other biometric recognition. When fingerprint authentication succeeds and face authentication fails in a human recognition method which performs fingerprint recognition and face recognition together, a compensation process of updating or adding the registered face authentication information can be performed using authentication-failed face input information.

If similarly-modified biometric information is measured and inputted after the compensation of the biometric authentication information, authentication may succeed in the present disclosure even when the probability of occurrence of authentication failure is high in the conventional method. Accordingly, the probability of authentication failure is reduced.

Thus, the human recognition system using two or more kinds of biometric information has an effect of improving authentication performance, because the mutually-differing biometric authentication results are compensated with each other.

The biometric information management method according to the present embodiment may be stored as computer-executable codes (computer program codes) in a computer-readable (or portable-computer-readable) storage medium 30. The computer-readable storage medium 30 may include all kinds of storage devices for storing data which are readable by a computer system. Examples of the computer-readable storage medium 20 include a ROM, a RAM, a CD-ROM, a magnetic tape, a floppy disk, an optical data storage device and a mobile application. The computer-executable codes may be executed by a processor (computer) 20.

The combinations of the respective steps of the accompanying flowcharts may be performed by computer program instructions. The computer program instructions may be installed in a general-purpose computer, a special-purpose computer or a processor of other programmable data processing devices. Thus, the instructions performed by a computer or a processor of other programmable data processing devices may generate a means for performing the functions described at the respective steps of the flowcharts. The computer program instructions may be stored in a computer-usable or computer-readable memory capable of aiming at a computer or other programmable data processing devices in order to realize a function in a specified manner. Thus, the instructions stored in the computer-usable or computer-readable memory may manufacture a production item including an instruction means for performing the functions described at the respective steps of the flowcharts. The computer program instructions may be installed on a computer or other programmable data processing devices. Thus, the instructions that operate a computer or other programmable data processing devices by performing a series of operation steps on the computer or other programmable data processing devices and generating a process executed by the computer may provide steps for executing the functions described at the respective steps of the flowcharts.

Furthermore, the respective steps may indicate a module, a segment, or a part of codes including at least one or more executable instructions for executing a specified logical function (specified logical functions). It should be noted that in some alternative embodiments, the functions referred to at the steps may be performed in different orders. For example, two steps illustrated one after another may be performed substantially at the same time or may often be performed in the reverse order depending on the corresponding function.

The foregoing descriptions are nothing more than exemplary descriptions of the technical concept of the present disclosure. A person having an ordinary knowledge in the technical field to which the present disclosure pertains will be able to easily understand that many different modifications and changes can be made without departing from the essential characteristics of the present disclosure. Accordingly, the embodiments disclosed herein are not intended to limit the technical concept of the present disclosure but are intended to describe the technical concept of the present disclosure. The scope of the technical concept of the present disclosure shall not be limited by these embodiments. The protection scope of the present disclosure shall be construed based on the appended claims. All the technical concepts falling within the scope equivalent to the claims shall be construed to be included in the protection scope of the present disclosure.

What is claimed is:

1. A biometric information management method, comprising:
   acquiring a first comparison result by comparing first biometric input information with registered first biometric authentication information;
   acquiring a second comparison result by comparing second biometric input information with registered second biometric authentication information;
   determining satisfaction or non-satisfaction of a predetermined authentication information compensation condition based on the first comparison result and the second comparison result; and
   compensating the first biometric authentication information by using the first biometric input information or compensating the second biometric authentication information by using the second biometric input information, when the authentication information compensation condition is satisfied in said determining,
   wherein said acquiring the first comparison result includes calculating a first similarity degree between the first biometric input information and the first biometric authentication information,
   wherein said acquiring the second comparison result includes calculating a second similarity degree between the second biometric input information and the second biometric authentication information, wherein said determining includes determining satisfaction or non-satisfaction of the authentication information compensation condition based on a result of comparison of the first similarity degree with a predetermined first threshold value and a result of comparison of the second similarity degree with a predetermined second threshold value, and wherein said determining includes determining authentication of the first biometric input information to be successful if the first similarity degree is equal to or larger than the first threshold value and determining authentication of the second biometric input information to be successful if the second similarity degree is equal to or larger than the second threshold value.

2. A non-transitory computer-readable storage medium including computer executable instructions, wherein the instructions, when executed by a processor, cause an apparatus to perform biometric information management operations, the operations comprising:

acquiring a first comparison result by comparing first biometric input information with registered first biometric authentication information;

acquiring a second comparison result by comparing second biometric input information with registered second biometric authentication information;

determining satisfaction or non-satisfaction of a predetermined authentication information compensation condition based on the first comparison result and the second comparison result; and compensating the first biometric authentication information by using the first biometric input information or compensating the second biometric authentication information by using the second biometric input information, when the authentication information compensation condition is satisfied in said determining, wherein said acquiring the first comparison result includes calculating a first similarity degree between the first biometric input information and the first biometric authentication information, wherein said acquiring the second comparison result includes calculating a second similarity degree between the second biometric input information and the second biometric authentication information, wherein said determining includes calculating a combined similarity degree based on the first similarity degree and the second similarity degree and determining satisfaction or non-satisfaction of the authentication information compensation condition based on a result of comparison of the combined similarity degree with a predetermined combination threshold value, and wherein said determining includes determining satisfaction or non-satisfaction of the authentication information compensation condition in view of a result of comparison of the first similarity degree with a predetermined first threshold value and a result of comparison of the second similarity degree with a predetermined second threshold value.

3. The non-transitory computer-readable storage medium of claim 2, wherein the predetermined authentication information compensation condition includes a first biometric authentication information compensation condition which is satisfied when biometric authentication based on the second comparison result succeeds and biometric authentication based on the first comparison result fails, and a second biometric authentication information compensation condition which is satisfied when biometric authentication based on the first comparison result succeeds and biometric authentication based on the second comparison result fails, the first biometric authentication information is compensated based on the first biometric input information when the first biometric authentication information compensation condition is satisfied, and the second biometric authentication information is compensated based on the second biometric input information when the second biometric authentication information compensation condition is satisfied.

4. The non-transitory computer-readable storage medium of claim 2, wherein the authentication information compensation condition includes a first biometric authentication compensation condition which is satisfied when the second similarity degree is equal to or larger than the second threshold value and the first similarity degree is equal to or larger than a first compensation threshold value smaller than the first threshold value, and a second biometric authentication compensation condition which is satisfied when the first similarity degree is equal to or larger than the first threshold value and the second similarity degree is equal to or larger than a second compensation threshold value smaller than the second threshold value.

5. A biometric information management apparatus, comprising a processor which executes program codes stored in a memory, wherein the executed program codes configure the apparatus to:

acquire a first comparison result by comparing first biometric input information with registered first biometric authentication information;

acquire a second comparison result by comparing second biometric input information with registered second biometric authentication information;

determine satisfaction or non-satisfaction of a predetermined authentication information compensation condition based on the first comparison result and the second comparison result; and when a result of the determination satisfies the authentication information compensation condition, compensate the first biometric authentication information by using the first biometric input information or compensate the second biometric authentication information by using the second biometric input information, wherein the program code is further configured to:

calculate a first similarity degree between the first biometric input information and the first biometric authentication information, calculate a second similarity degree between the second biometric input information and the second biometric authentication information, calculate a combined similarity degree based on the first similarity degree and the second similarity degree and to determine satisfaction or non-satisfaction of the authentication information compensation condition based on a result of comparison of the combined similarity degree with a predetermined combination threshold value, and determine satisfaction or non-satisfaction of the authentication information compensation condition in view of a result of comparison of the first similarity degree with a predetermined first threshold value and a result of comparison of the second similarity degree with a predetermined second threshold value.

6. The apparatus of claim 5, wherein the predetermined authentication information compensation condition includes a first biometric authentication information compensation condition which is satisfied when biometric authentication based on the second comparison result succeeds and biometric authentication based on the first comparison result fails, and a second biometric authentication information compensation condition which is satisfied when biometric authentication based on the first comparison result succeeds and biometric authentication based on the second comparison result fails, and the program code is configured to compensate the first biometric authentication information based on the first biometric input information when the first biometric authentication information compensation condition is satisfied, and to compensate the second biometric authentication information based on the second biometric input information when the second biometric authentication information compensation condition is satisfied.

7. The apparatus of claim 5, wherein the program code is configured to determine authentication of the first biometric input information to be successful when the first similarity degree is equal to or larger than the first threshold value, and to determine authentication of the second biometric input information to be successful when the second similarity degree is equal to or larger than the second threshold value.

8. The apparatus of claim 5, wherein the authentication information compensation condition includes a first biometric authentication compensation condition which is satisfied when the second similarity degree is equal to or larger than the second threshold value and the first similarity degree is equal to or larger than a first compensation threshold value smaller than the first threshold value, and a second biometric authentication compensation condition which is satisfied when the first similarity degree is equal to or larger than the first threshold value and the second similarity degree is equal to or larger than a second compensation threshold value smaller than the second threshold value.

* * * * *